United States Patent
Jacquemin

(10) Patent No.: US 8,226,229 B2
(45) Date of Patent: Jul. 24, 2012

(54) NOSE BEARING ASSEMBLY FOR SPECTACLES, AND SPECTACLES INCLUDING SAME

(75) Inventor: Didier Jacquemin, La Mouille (FR)

(73) Assignee: Logo, Morez (FR)

( * ) Notice: Subject to any disclaimer, the term of this patent is extended or adjusted under 35 U.S.C. 154(b) by 0 days.

(21) Appl. No.: 13/120,005

(22) PCT Filed: May 20, 2009

(86) PCT No.: PCT/FR2009/050945
§ 371 (c)(1),
(2), (4) Date: Mar. 21, 2011

(87) PCT Pub. No.: WO2010/034910
PCT Pub. Date: Apr. 1, 2010

(65) Prior Publication Data
US 2011/0170053 A1  Jul. 14, 2011

(30) Foreign Application Priority Data
Sep. 26, 2008 (FR) ...................................... 08 56486

(51) Int. Cl.
*G02C 5/12* (2006.01)
(52) U.S. Cl. .......................................... 351/137; 351/76
(58) Field of Classification Search .................... 351/65, 351/69, 76, 136, 137, 138, 139; D16/333
See application file for complete search history.

(56) References Cited

U.S. PATENT DOCUMENTS

| 4,600,279 | A | | 7/1986 | Tabacchi | |
| 4,792,222 | A | * | 12/1988 | Labenz et al. | 351/136 |
| 5,581,312 | A | * | 12/1996 | Chen | 351/138 |
| 6,364,480 | B1 | * | 4/2002 | Chen | 351/138 |
| 7,048,371 | B1 | | 5/2006 | Moore | |
| 7,314,277 | B2 | * | 1/2008 | Lin | 351/136 |
| 7,472,991 | B1 | * | 1/2009 | Chen | 351/137 |
| 7,543,933 | B2 | * | 6/2009 | Lee | 351/138 |

FOREIGN PATENT DOCUMENTS

| FR | 2565366 A3 | 12/1985 |
| FR | 2757279 A1 | 6/1998 |
| WO | 03062904 A1 | 7/2003 |

* cited by examiner

Primary Examiner — Hung Dang
(74) Attorney, Agent, or Firm — Bachman & LaPointe, P.C.

(57) ABSTRACT

A nose bearing assembly is secured onto a central area of the spectacles, directly on the optical or sun lenses, or on the bridge connecting the lenses or on a rim frame of the latter, each of the two nose bearing assemblies having a pad intended to contact the nose ala of a user and carried by a pad-bearing arm connected to the spectacles, characterized in that the pad is made of a elastically deformable material and is divided into two areas, i.e. an upper area for receiving a free end of the pad-bearing arm or securing and stiffening the pad in area, and another lower area capable of elastic deformation and of floating freely in all directions in order to obtain a self-adjustment of the pads independently from the morphology of the nose of the user when in contact with the latter.

10 Claims, 2 Drawing Sheets

NOSE BEARING ASSEMBLY FOR SPECTACLES, AND SPECTACLES INCLUDING SAME

BACKGROUND

This invention relates to a nose bearing assembly for spectacles.

Such an assembly is intended to be attached to a central area of said spectacles.

It may be attached directly on corrective spectacles or sunglasses, at the bridge connecting the lenses, or on a frame surrounding them.

Each nose bearing assembly, of which there are two, consists of a pad intended to come into contact with a side of the nose of a wearer and be supported by a pad-bearing arm connected to the spectacles, as mentioned above.

In fact, one of the objectives of the invention is to obtain, at a lower cost, a nose bearing assembly capable of being freely self-adjusted, according to a front angle and a top angle, called a "caster" angle, with respect to the vertical and horizontal axes of the nose of a wearer.

It has already been suggested that such a pivoting can be obtained according to the aforementioned angles by pivoting the pad on its pad-bearing arm, by means of a threaded yoke at the free end of the pad-bearing arm, on which a drilled tab attached to the pad can be attached, in which the connection between the yoke of the pad-bearing arm and the tab of the pad is produced by means of a screw screwed into the threaded yoke and passing freely through the tab of the pad, while giving it pivoting freedom according to the aforementioned angles.

Thus, according to the prior art, the nose bearing assembly consists of a pad-bearing arm, a threaded yoke, a screw, an attachment tab and a pad. This means that five parts are necessary for each side, and therefore ten parts are necessary to obtain a complete nose bearing assembly.

These multiple parts increase costs, both with regard to the parts to be implemented and the handling for implementing them.

This also results in significant bulk in the lateral direction of the pad bearing associated with the plate.

Another disadvantage lies in the fact that it is difficult to properly position the pads. In addition, successive deformations of the pad bearing can lead to breakage after a certain amount of time. Finally, this system produces a large number of recesses in which, over time, impurities can collect, adversely affecting the aesthetics of the spectacles.

Attempts have been made to overcome these disadvantages by proposing pads made of plastic, intended to cover a metal core of a pad bearing. However, these pads have the disadvantage of being very bulky and cannot be used on any type of spectacles.

Another known system consists of producing pads that fit on the pad bearing. The pad then has at least one space in which the pad bearing is positioned, with hard points intended to come into contact with protuberances of the pad bearing, so as to ensure secure holding.

In this way, it is possible to limit the number of parts, while being capable of positioning the pads with respect to the nose. However, the disadvantage lies in the fact that the pad-bearing arm is inserted into the pad over almost the entire length thereof, which prevents any possibility of flexibility of the pad. In fact, the pad-bearing arm rigidifies the pad, over the entire length thereof, which is detrimental to the comfort of the wearer.

It has also been proposed, in order to make the pads flexible, to create plates on said pads, coming into direct contact with the sides of the wearer's nose. However, this creates as many contact points as there are plates, which can be uncomfortable for the wearer.

SUMMARY OF THE INVENTION

This invention is intended to overcome these disadvantages and thus relates to a nose bearing assembly intended to be attached to a central spectacle area, directly on the corrective spectacles or sunglasses, on the bridge connecting the lenses, or on a frame surrounding them, in which each nose bearing assembly, of which there are two, consists of a pad, intended to come into contact with a side of the wearer's nose, and be supported by a pad-bearing arm connected to the spectacles, characterized in that the pad is made of a resiliently deformable material and is subdivided into two areas, of which one, the upper area, is intended to receive a free end of the pad-bearing arm, so as to ensure the attachment and rigidification of said pad in said area, while the other, the lower area, is free to be resiliently deformed, capable of floating freely in any direction, so as to obtain self-adjustability of the pads, regardless of the shape of the wearer's nose, in contact with same.

In this way, the pad is rigidly held on the pad bearing, while providing a flexible and comfortable area in contact with the wearer's nose.

The invention also relates to features that will become clear from the following description, and that should be considered alone or according to all of the possible combinations thereof.

BRIEF DESCRIPTION OF THE DRAWINGS

This description, provided as a non-limiting example, will make it easier to understand how the invention can be produced, in reference to the appended drawings, in which.

DETAILED DESCRIPTION OF THE PREFERRED EMBODIMENT(S)

Figure 1:
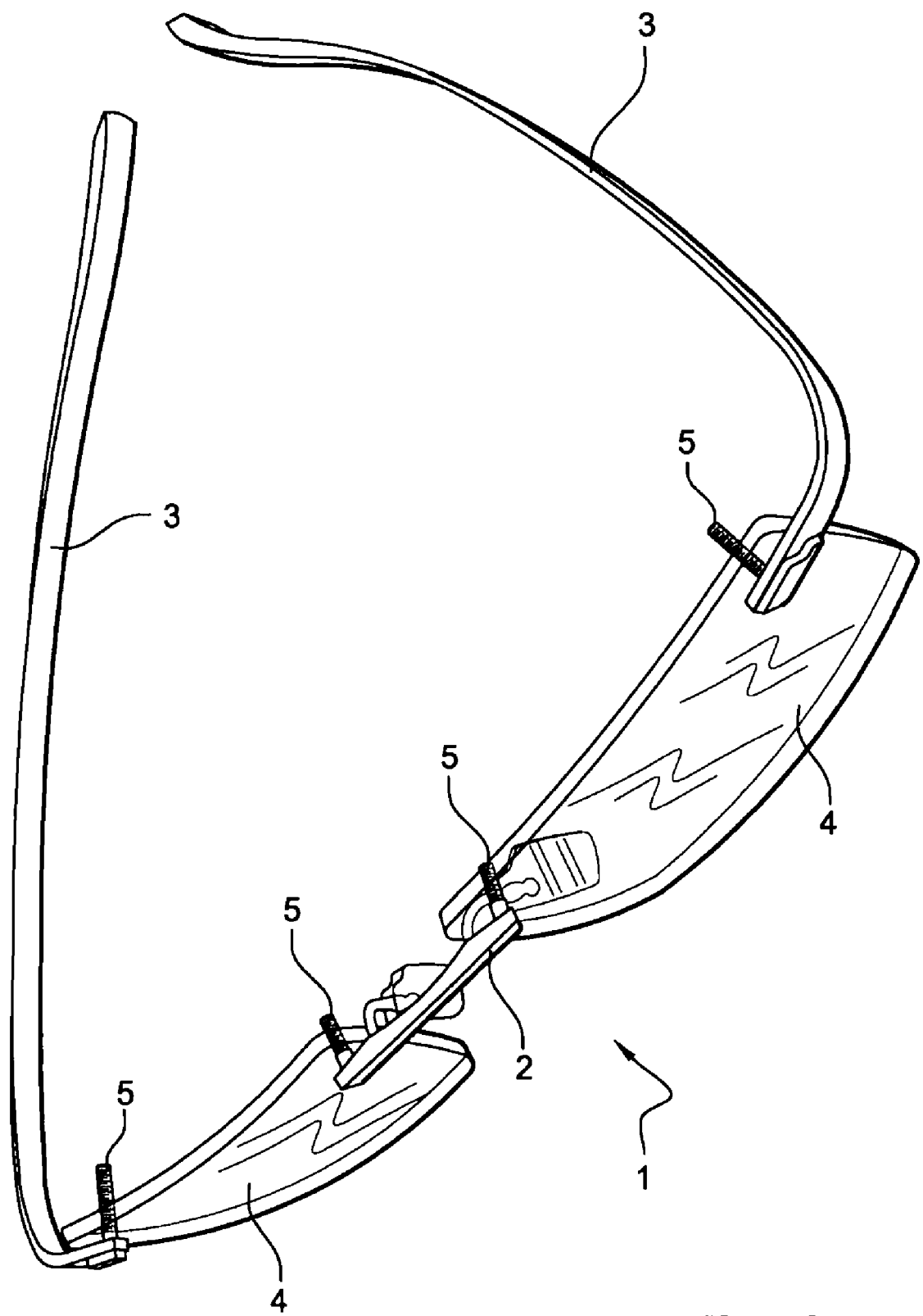
FIG. 1 shows, in perspective, a pair of spectacles comprising a nose bearing assembly according to the invention.
Figure 2:
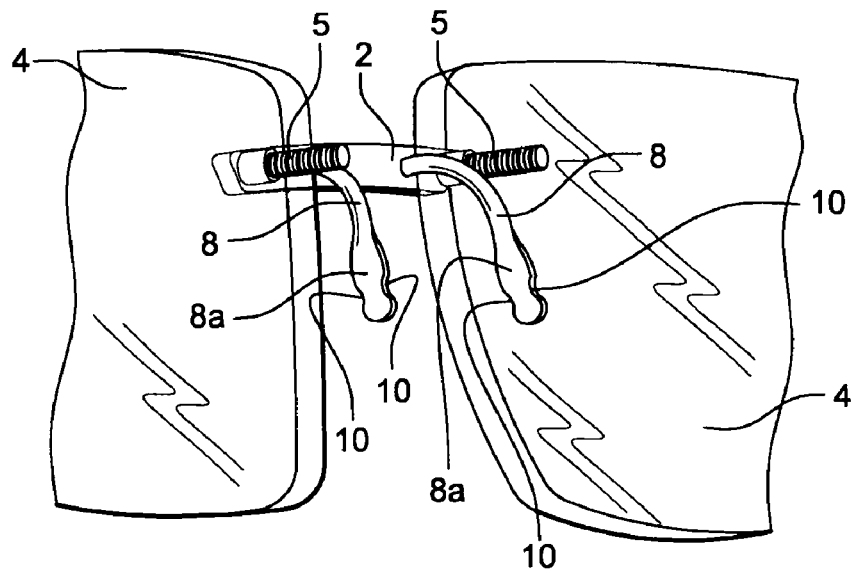
FIG. 2 shows, in perspective, a pad-bearing arm mounted on a nose bridge, according to an example adaptation, before assembly of the pads.
Figure 3:
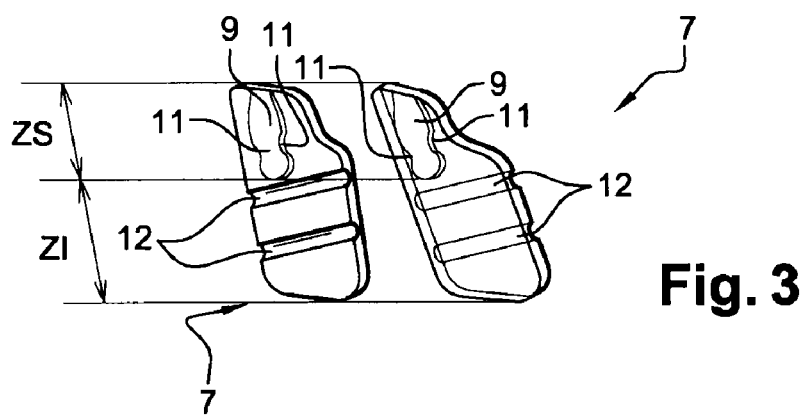
FIG. 3 shows, in perspective, a pair of pads intended to be mounted on the pad bearings according to FIG. 2.
Figure 4:
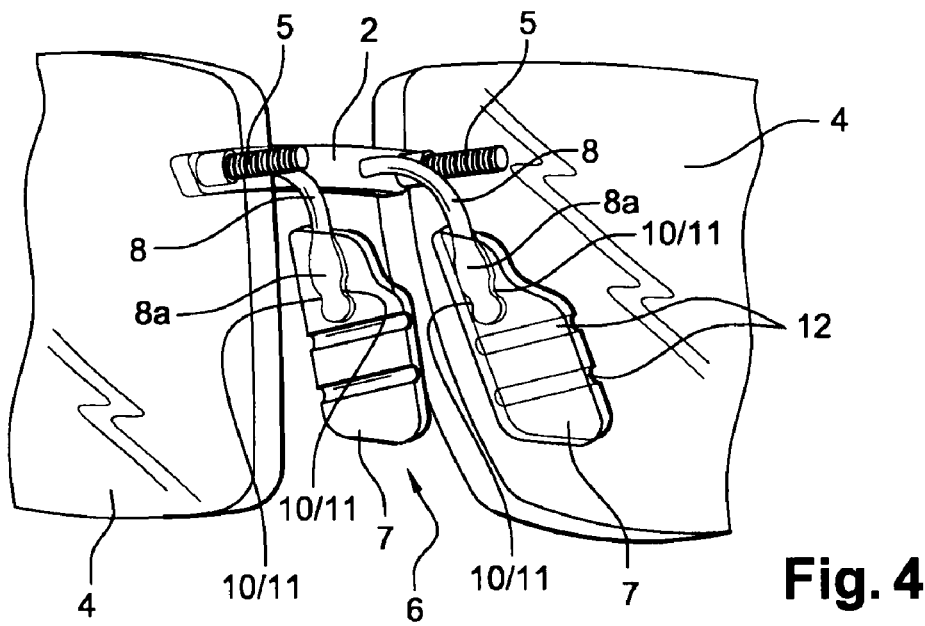
FIG. 4 is a perspective view showing a nose bearing assembly, after final assembly of the pads on the pad bearings ready to be used.

The invention applies in general to any type of spectacles 1. In this case, it involves drilled spectacles, i.e. without a frame, in which the central nose 2 as well as the stems 3 are mounted directly on the lenses 4, by means of screws 5.

Of course, it can also relate to circle frames and corrective spectacles or sunglasses.

According to the invention, the pad 7 is made of a resiliently deformable material and is subdivided into two areas of which one, the upper area "ZS", is intended to receive a free end 8a of the pad bearing 8, so as to ensure the attachment and rigidifying of said pad 7 in said area, while the other, the lower area "ZI", is free to be resiliently deformed, capable of floating freely in any direction, so as to obtain self-adjustability of the pads 7, regardless of the shape of the wearer's nose, in contact with same.

Advantageously, the attachment and rigidification of the upper area "ZS" of the pad 7 are performed by anchoring means, arranged in a sleeve 9 of the pad 7 and at the free end 8a of the pad bearing 8, so as to mutually cooperate with one another.

According to this example embodiment, the anchoring means consist of at least one reduction 10, produced at the free end 8a of the pad-bearing arm 8, and a substantially corresponding embossment 11, produced inside the sleeve 9 of the pad 7, with one going into the other by fitting by resilient deformation of the pad 7, or conversely, when the pads 7 are deposited, in order to replace them.

In this case, two embossments 11 are produced inside the sleeve 9 of the pad 7 and two corresponding reductions 10 are produced at the free end 8a of the pad-bearing arms 8.

The resilient clamping should be sufficient to prevent any accidental sliding of the pad 7 with respect to the pad bearing 8.

In fact, the pad-bearing arm 8 has sufficient rigidity for holding over time, but allows resilient deformation enabling an adjustment of the positioning of the pads 7.

Such an assembly should be capable of being disassembled, by applying a sufficient pulling force on the pad. But it must also ensure sufficient holding so as to prevent any accidental disassembly of the same pad 7 from the pad-bearing arm 8.

This will be achieved by choosing, as a material forming the pad 7, a sufficiently rigid plastic material and by forming a sleeve 9 with dimensions substantially corresponding to those of the end 8a of the pad-bearing arm 8, while ensuring that the material is flexible enough to undergo resilient deformations in contact with the wearer's nose.

This is why the pad 7 is obtained by injection or forming of silicone, PVC or any other material, such as Santoprene™ or SEBS elastomers, and so on.

In general, the material forming the pad 7 can also be either thermoplastic or thermosetting.

With regard to the pad-bearing arm 8, it is made of a metal material having rigidity and resilient deformation properties.

The arms 8 may be produced by injection, sintering or forming, but preferably are made of metal, such as stainless steel, aluminum or titanium, or any other alloy making it possible to have rigidity and resilient deformation.

According to another feature of the invention, the pad 7 comprises, in the lower free area "ZI", on the face opposite that in contact with the side of the wearer's nose, striations 12 intended to create lines for thinning the thickness of the pad 7, so as to increase the deformability and adaptability thereof.

Preferably, the striations 12 of the pads 7 are mutually parallel, in a direction substantially perpendicular to the axis of the sleeve 9, intended to receive the free end 8a of the pad-bearing arm 8.

However, the striations 12 can also be produced obliquely, parallel to the angle of the user's nose, for better comfort. This makes it possible to produce a conformation of the pad 7 corresponding to the shape of the user's nose, while ensuring the broadest possible contact between the pad 7 and the nose, while having a compact size.

According to an alternative embodiment, the nose bearing assembly 6 described above is matched with another identical nose bearing assembly 6, in which the pad-bearing arms 8 are connected to one another by an extension of the upper ends thereof, so as to form a one-piece nose bridge.

According to an alternative embodiment, the nose bearing assembly 6 described above is matched with another identical nose bearing assembly 6, in which the pad bearings 7 are connected to one another by an extension of the upper ends thereof, so as to form a one-piece nose bridge.

The invention also relates to spectacles equipped with two nose bearing assemblies as described above.

The invention claimed is:

1. A nose bearing assembly intended to be attached to a central spectacle area, directly on one of corrective spectacle and sunglass lenses, at one of the bridge connecting the lenses, and on a frame surrounding the lenses, each nose bearing assembly, of which there are two, consisting of a pad which comes into contact with a side of a nose of a wearer and which is supported by a pad-bearing arm connected to the spectacles, the pad being made of a resiliently deformable material and being subdivided into two areas, of which one, is an upper area, which receives a free end of the pad-bearing arm, so as to ensure attachment and rigidification of said pad in said upper area, and which a second is a lower area, comprises, on a face opposite a second face in contact with a side of the wearer's nose, striations for creating lines for thinning a thickness of the pad, so as to make the pad free to be resiliently deformed and capable of floating freely in any direction, so as to obtain self-adjustability of the pads, regardless of the shape of the wearer's nose, in contact with the pads.

2. An assembly according to claim 1, wherein the attachment and rigidification of the upper area of the pad is performed by means of anchoring means, arranged in a sleeve of the pad and at the free end of the pad bearing arm, so as to mutually cooperate with one another.

3. The assembly according to claim 2, wherein the anchoring means consist of at least one reduction, produced at the free end of the pad-bearing arm, and a substantially corresponding embossment, produced inside the sleeve of the pad, with one going into the other by fitting by resilient deformation of the pad, or conversely, when the pads are deposited, in order to replace them.

4. The assembly according to claim 1, wherein the pad is made of a thermosetting material.

5. The assembly according to claim 1, wherein the pad is made of a thermoplastic material.

6. The assembly according to claim 1, wherein the pad-bearing arm is made of a metal material having rigidity and resilient deformation properties.

7. The assembly according to claim 1, wherein the striations of the pads are mutually parallel in a direction substantially perpendicular to an axis of the sleeve, intended to receive the free end of the pad-bearing arm.

8. The assembly according to claim 1, wherein the assembly is matched with another identical nose bearing assembly, in which the pad-bearing arms are connected to one another by an extension of the upper ends thereof, so as to form a one-piece nose bridge.

9. Assembly according to claim 1, wherein the assembly is matched with another identical nose bearing assembly, in which the pad bearings are connected to one another by an extension of the upper ends thereof, so as to form a one-piece nose bridge.

10. Spectacles equipped with two nose bearing assemblies according to claim 1.

* * * * *